United States Patent
Liang et al.

(10) Patent No.: US 9,188,160 B2
(45) Date of Patent: Nov. 17, 2015

(54) CONFIGURATION FOR A ROLLER OF A ROLLER BEARING

(75) Inventors: Baozhu Liang, Dittelbrunn-Hambach (DE); Michael Reugels, Knetzgau (DE)

(73) Assignee: AKTIEBOLAGET SKF, Gothenburg (SE)

( * ) Notice: Subject to any disclaimer, the term of this patent is extended or adjusted under 35 U.S.C. 154(b) by 99 days.

(21) Appl. No.: 14/119,714

(22) PCT Filed: May 24, 2012

(86) PCT No.: PCT/EP2012/059736
§ 371 (c)(1),
(2), (4) Date: Jan. 21, 2014

(87) PCT Pub. No.: WO2012/160147
PCT Pub. Date: Nov. 29, 2012

(65) Prior Publication Data
US 2014/0126850 A1 May 8, 2014

(30) Foreign Application Priority Data

May 24, 2011 (DE) .......................... 10 2011 076 329

(51) Int. Cl.
*F16C 33/34* (2006.01)
*F16C 33/36* (2006.01)
*F16C 19/36* (2006.01)

(52) U.S. Cl.
CPC ............. *F16C 33/366* (2013.01); *F16C 19/364* (2013.01); *F16C 33/34* (2013.01); *Y10T 29/49693* (2015.01)

(58) Field of Classification Search
CPC .... F16C 19/364; F16C 19/365; F16C 19/367; F16C 19/368; F16C 33/36; F16C 33/366; F16C 33/585; F16C 2240/50
USPC ................................................... 384/564, 565
See application file for complete search history.

(56) References Cited

U.S. PATENT DOCUMENTS

| | | | | |
|---|---|---|---|---|
| 1,736,037 A | * | 11/1929 | Else | ............................... 384/565 |
| 4,915,513 A | * | 4/1990 | Orain | ............................. 384/447 |
| 2008/0292233 A1 | | 11/2008 | Weidner | |
| 2009/0003747 A1 | | 1/2009 | De Mul | |

FOREIGN PATENT DOCUMENTS

| | | |
|---|---|---|
| DE | 102005061179 A1 | 6/2007 |
| DE | 102008020068 A1 | 1/2009 |
| JP | 04-331813 A | 11/1992 |

* cited by examiner

*Primary Examiner* — Phillip A Johnson
(74) *Attorney, Agent, or Firm* — Bryan Peckjian; SKF USA Inc. Patent Dept.

(57) ABSTRACT

A tapered roller for a tapered roller bearing, the tapered roller bearing having a raceway and a flange, and the tapered roller having a rolling surface configured to roll on the raceway and an end surface at the end of the rolling surface configured to face the flange. The end surface includes an abutment surface having a curvature and a radially outer end and a radially inner end and is configured to contact the flange. The curvature increases monotonically from a starting point on the abutment surface to the radially inner end of the abutment surface.

17 Claims, 3 Drawing Sheets

CONFIGURATION FOR A ROLLER OF A ROLLER BEARING

CROSS-REFERENCE

This application is the U.S. National Stage of International Application No. PCT/EP2012/059736 filed on May 24, 2012, which claims priority to German patent application no. 10 2011 076 329.5 filed on May 24, 2011.

TECHNOLOGICAL FIELD

The present invention relates to a configuration of a roller of a roller bearing, in particular for a tapered roller bearing.

BACKGROUND

Guide flanges in roller bearings, such as e.g. tapered roller bearings, can be either straight or spherical. Straight flanges are mainly used for roller bearings of smaller diameters and thus also smaller flange widths. In this case, a flange width is often too small to produce a defined profile on an available flange surface. Spherical flanges, i.e. flanges having a constant curvature, find application mostly in roller bearings having larger diameters and thus also having larger flange widths. A spherical flange is characterized in that a radius, which defines a flange shape facing towards a roller raceway, has its origin substantially on an axis of rotation of the rollers (roller rotational axis), wherein small deviations are allowed due to alignment errors.

For reducing the sliding friction between the flanges and the end surfaces of the rollers of a roller bearing, the sections of the end surfaces of the rollers of conventional bearings, which sections oppose the flanges, are spherical, in order to achieve a small contact surface. In the case of a flange that is also spherical, the curvature of the flange is smaller than the curvature on the end surface of the roller.

For a more detailed description of roller bearings having spherical flanges, FIG. 1 shows, in a schematic representation, a longitudinal section of a roller bearing 10, which is formed in an exemplary manner as a tapered roller bearing. The roller bearing 10 includes a bearing inner ring 11, a bearing outer ring 12, and a plurality of rollers 13, which can roll on races or raceways 14, 15 formed by the inner sides of the bearing rings 11, 12. In the case of a tapered roller bearing, tapered rollers are the rollers corresponding to the rollers or rolling-element rollers or rolling elements 13.

The tapered rollers 13 can roll on an inner raceway 14, which is formed in the bearing inner ring 11, and on an outer raceway 15, which is formed in the bearing outer ring 12. In a tapered roller bearing, the raceways 14, 15 are formed as conical outer surfaces. In the longitudinal section shown in FIG. 1 of the tapered roller bearing 10, the raceways 14, 15 define, in an imaginary extension, an inner line 16 and an outer line 17, which meet on an axis of rotation 18 of the roller bearing 10 ideally at a center of rotation 19.

During operation of the bearing 10, each (tapered) roller 13 rotates around its own roller axis 20, wherein an imaginary extension of the roller axis 20 ideally also intersects with the center of rotation 19. For the tapered rollers 13, a rolling condition on the raceways 14, 15 is realized by a relative position of the inner line 16, outer line 17, bearing axis of rotation 18, and roller axis 20, which all intersect in the center of rotation 19, so that during a relative rotation of bearing inner ring 11 and bearing outer ring 12, the tapered rollers 13 roll on the raceways 14, 15 substantially without slippage, and an amount of sliding friction related thereto is minimized.

When supporting axial forces, in order to also optimize the friction that occurs in the axial direction, i.e. in the direction of the bearing rotational axis 18, the rollers 13 used in roller bearings can have a curvature on their end side 21, identified by a radius R, so that the sections of the end side surface of the roller 13, which sections oppose the flanges, have the shape of a ball surface. As is indicated in the enlargement of FIG. 1, this surface is in contact at a contact point 22 with a straight- or spherically-embodied flange 23, for example of the bearing inner ring 11.

Away from the region of a possible contact point 22, the end side 21 can also be flat or have another shape, while the sections of the end surfaces of the roller 13, which sections oppose the flanges, have a constant curvature. Curvature is generally understood to mean the change in direction per traversed length of an infinitesimally short curved piece. A circle having the radius r thus has the same, constant curvature 1/r everywhere; its direction changes everywhere equally strongly. With all other curves the curvature can vary from curve point to curve point, or along a path on the one three-dimensional surface. The inverse of the curvature is referred to as the radius of curvature. This is the radius of that circle (circle of curvature) which represents the best approximation of the observed curve in the vicinity of the contact point.

In roller bearings, such as for example cylindrical roller-, barrel roller-, or ball-bearings, which are designed with straight or flat flanges, in comparison to spherically embodied flanges the roller-flange contact has a higher surface pressure (Hertzian pressure) between the roller end side 21 and the flange surface. Here the Hertzian pressure is understood to be the greatest pressure that prevails in the middle of the contact surface of two elastic bodies. If, such as with roller bearings having straight flanges, two elastic bodies (curved roller end side and straight or flat flange) are pressed against each other, then in the ideal case they touch only in a punctiform manner. However, in the real case, a flattening and thus a contact surface arises at the contact point 22 due to the elasticity. A characteristic pressure distribution (surface pressure) arises on the contact surface in both bodies, wherein the pressure is always highest in the middle. If, as here, a ball outer surface and a flat flange surface touch, a touch- or contact-ellipse results. Due to the comparatively high surface pressure, with roller bearings having straight flanges, a relatively poor lubricant film formation generally results at higher effective forces. In addition, in comparison to spherical flanges, straight or flat flanges lead to smaller contact ellipses between the roller end side and the flange surface facing this, for which reason an overlapping of the contact ellipse with the flange edges can result only at extreme loads. Likewise, with straight- or flat-embodied flanges, there is a low sensitivity of the contact point 22 to alignment errors, so that a defined contact point 22 between roller 13 and flange is possible. While on the one hand a greater skewing of the roller 13 is made possible with flat-embodied flanges, on the other hand a relatively poor guiding of the rollers results during operation.

Tapered roller bearings in the large bearing field can, as shown with reference to FIG. 1, be embodied with spherical flanges 23, which compared to straight or flat flanges results in a lower surface pressure between the roller end side 21 and the flange surface or abutment surface facing towards the roller 13. In addition, spherically-designed flanges 23 lead, compared to straight flanges, to larger contact ellipses between the roller end side 21 and the opposing flange surface, so that overlappings of the contact ellipse with the flange edges and thus edge stresses can frequently result. In general, with spherically-designed flanges 23 there is a higher sensitivity of the contact point 22 to alignment errors than is the case with flat- or straight-embodied flanges. Although on the one hand spherical flanges have a lower skewing of the roller 13 as a consequence, on the other hand due to the narrow osculation between the roller end side 21 and the flange surface facing towards roller 13, the roller 13 can be guided better during operation. A defined contact point 22 between the roller 13 and the flange 23 is also theoretically possible with spherical flanges by a different choice of the radii of curvature (and/or their origins) of roller end surface 21 and spherical flange surface.

However, one of the main disadvantages of a spherical flange and a spherical end surface of the rolling-element roller is the resulting sensitivity of the contact point 22 between the roller end side 21 and the flange 23 to alignment error. Deviations in the raceway angle, roller angle, flange radius, as well as roller end side radius have a decisive influence thereon.

SUMMARY

One aspect of the present invention is therefore to reduce this sensitivity of the contact point between roller end side and flange with regard to alignment error.

In order to achieve this, an appropriately optimized geometry or configuration of the end surface of the roller is proposed herein, in particular a specific geometry or configuration of an abutment surface for contacting a flange of a bearing ring, with which the rollers having the abutment surface can come into contact.

In particular, the end surface has an abutment surface for contacting a flange of a bearing ring, the curvature of which abutment surface increases monotonically from a starting point on the abutment surface up to an end of the abutment surface.

A low Hertzian pressure is on the one hand ensured by the curved surface, while the risk of an overlapping of the rolling element with the flange edge can simultaneously be minimized by the increase of the curvature up to the end of the abutment surface. That is, the contact point between end surface of the roller and flange is less sensitive to alignment errors. In this context, "abutment surface" on the end surface of the roller is understood to be the part of the end surface with which the end surface of the roller can theoretically come into contact with a flange of a bearing ring according to the given geometric conditions. In addition, the end surface can have additional end surface portions, the geometry of which can be arbitrary, for example flat or curved.

In some exemplary embodiments of the invention, a roller for a roller bearing thus has an end surface terminating (located at one end of) the rolling surface of the roller, which end surface has an abutment surface for contacting a flange of a bearing ring, the curvature of which abutment surface increases monotonically from a starting point on the abutment surface up to an end of the abutment surface.

In some exemplary embodiments the starting point is disposed on the radially outer end of the abutment surface, which radially outer end is adjacent to the raceway and the rolling surface. This can bring about a maximum compensation of skewing in one direction.

In some exemplary embodiments, the starting point is disposed between a radially outer end of the abutment surface, which radially outer end is adjacent to the raceway and the rolling surface, and a radially inner end of the abutment surface, which radially inner end is facing away from the raceway (i.e., is spaced radially inward of the rolling surface), wherein the curvature of the abutment surface increases monotonically from the starting point towards both ends of the abutment surface. In this way a skewing of the bearing can be compensated in two different directions. In some exemplary embodiments, the roller-flange geometry can be designed such that for an ideal geometry the contact point or contact region between abutment surface and flange lies at the starting point.

In some exemplary embodiments, the curvature increases strongly monotonically from the starting point up to the respective end of the abutment surface, which can ensure an optimal contact ellipse for each point on the abutment surface.

In some further exemplary embodiments, the monotonic curvature is such that within a first region comprising the starting point, the curvature increases monotonically or strongly monotonically, wherein in a second region lying between the first region and the end of the abutment surface, the curvature is constant or 0. In the second region, the abutment surface can thus for example be flat and have the curvature 0.

In some exemplary embodiments, a first region of the abutment surface comprising the starting point has a constant first curvature which is less than a second curvature of the abutment surface in a second region which is adjacent to the first region. In other words, the curvature is constant in the first region, and the curvature is also constant in the second region which is adjacent to the first region and between the first region and the end of the abutment surface, but greater than in the first region. With the same advantages this can effect a simplification of the production of the rollers. Of course, in further exemplary embodiments a plurality of regions each having constant curvature can neighbor one another, wherein the curvature of each region lying farther in the direction of the end of the abutment surface is greater than the curvature of the region adjacent in the direction of the starting point.

In some exemplary embodiments, the curvature is chosen such that an angle ($\alpha$) between a tangential plane at the end of the abutment surface and a second tangential plane on a spherical surface extending from the starting point up to the end of the abutment surface, the spherical surface having a curvature corresponding to the curvature at the starting point, falls in a range from greater than 0° to 30°. In conventional flange geometries, this increase of the curvature can sufficiently improve the sensitivity with respect to alignment errors.

According to some exemplary embodiments, the roller is a tapered roller of a tapered roller bearing.

BRIEF DESCRIPTION OF THE DRAWINGS

Exemplary embodiments of the present invention are explained in more detail below with reference to the accompanying figures.

DETAILED DESCRIPTION

Figure 1:
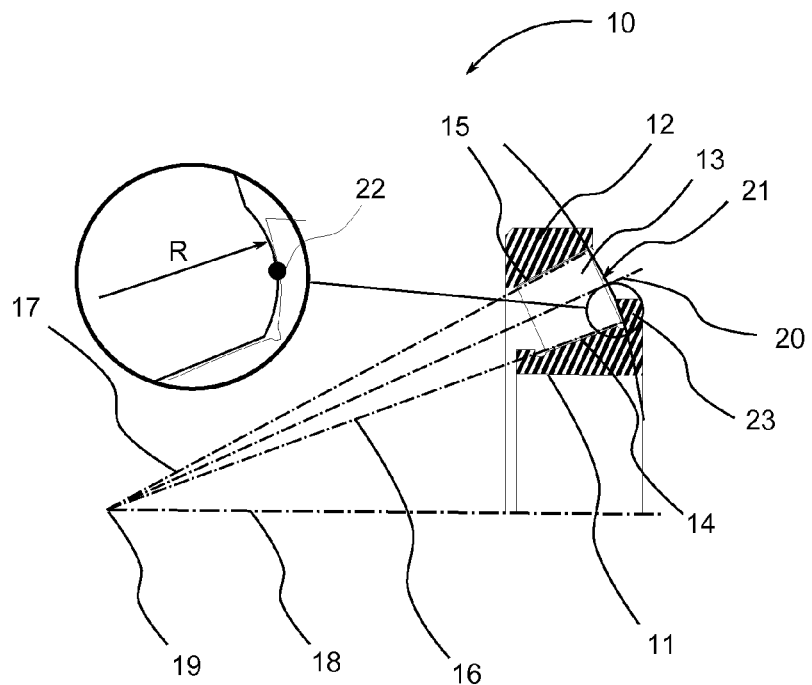
FIG. 1 shows a schematic longitudinal section through a roller bearing having spherical flanges.
Figure 2:
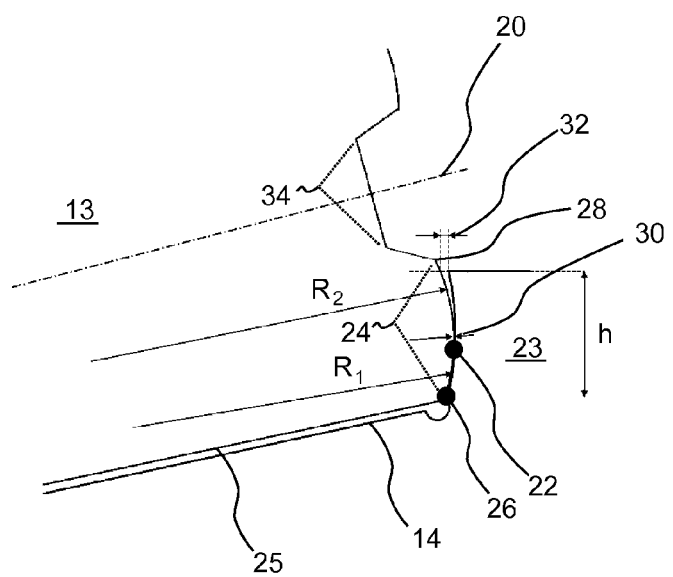
FIG. 2 shows a schematic longitudinal section through a roller having an end surface according to an exemplary embodiment of the present invention.

FIG. 2 shows a schematic longitudinal section through a rolling-element roller (which may be referred to herein as a "roller" or "rolling element") according to an exemplary embodiment of the present invention.

A part of a roller 13 is depicted. The roller 13 has a roller end surface 21, which comprises a curved abutment surface 24, with which the roller is in contact with the flange 23, or with which it can come into contact in principle due to the geometric edge conditions. In the example depicted, the flange 23 has a purely spherical geometry, i.e. the surface of the flange facing towards the roller has a constant curvature in the radial direction over the entire flange height h. The roller 13 also includes a rolling surface 25 in contact with the raceways 14, 15.

As depicted in FIG. 2, a curvature of an abutment surface 24 on the end side 21, which abutment surface 24 is facing towards the flange 23, increases monotonically from a starting point 26 on the abutment surface 24 up to an end 28 of the abutment surface, i.e. it becomes continuously larger up to the end. The starting point 26 is located on the radially outer end of the abutment surface 24, which radially outer end is adjacent to the rolling surface 25, so that the curvature R1 is smaller than the curvature R2.

If the contact point 22 lies as depicted in FIG. 2, it results from the curvature of the abutment surface 24 that a first gap size 30 in the vicinity of the contact point 22 is smaller than a more distant second gap size 32, which leads to a reduced sensitivity to alignment errors.

In addition to the abutment surface 24, the end surface of the exemplary embodiment depicted has another end surface portion 34 which is flat; however in further exemplary embodiments it can have any other geometries.

As was already mentioned, the curvature shall be understood in this case to mean a change of direction per unit length. As a measure for a sign-independent direction change, the curvature is positive or zero. The curvature e.g. of a straight line is everywhere equal to zero, since its direction does not change. A circle having a radius r has the same curvature everywhere (namely 1/r), since its direction changes everywhere equally strongly. With all other curves the curvature changes from curve point to curve point. The curvature of a curve at a point thus indicates how strongly the curve deviates, in the immediate vicinity of the point, from a straight line. A measure for the curvature of a curved surface, such as for example the abutment surface 24, can for example also be the increasing deviation of the surface from a plane tangential to the surface at a given point. A stronger curvature makes itself noticeable as a stronger deviation from the plane. A monotonically increasing curvature thus means that if one moves along a locus curve along a surface, with each infinitesimal step along the locus curve the curvature either is larger or remains the same. A strongly-monotonically-increasing curvature correspondingly means that with each infinitesimal step the curvature along the locus curve is larger.

In the exemplary embodiment illustrated in FIG. 2, the starting point 26 is located directly on an end of the abutment surface 24, which end is adjacent to the rolling surface 25. The curvature thus increases monotonically from the starting point 26 up to the end 28 of the abutment surface 24, which end 28 is facing away from the raceway, in stated differently, is spaced radially inward from the rolling surface 25.

Figure 3:
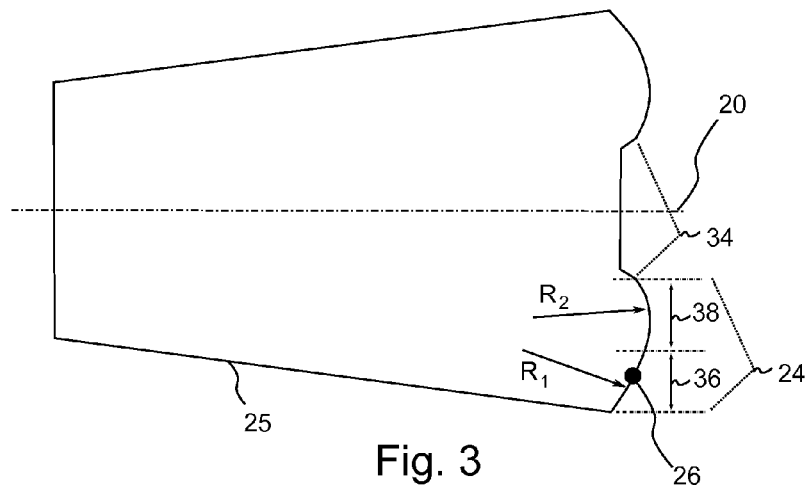
FIG. 3 shows a schematic longitudinal section through a roller having an end surface according to a further exemplary embodiment of the present invention.

FIG. 3 schematically shows a further exemplary embodiment wherein the curvature does not increase strongly monotonically but rather in sections. That is, in a first region 36 of the abutment surface 24, which first region 36 comprises the starting point 26, this first region 36 has a constant curvature R1 which is smaller than a second curvature R2 of the abutment surface in a second region 38 adjacent to the first region.

Figure 4:
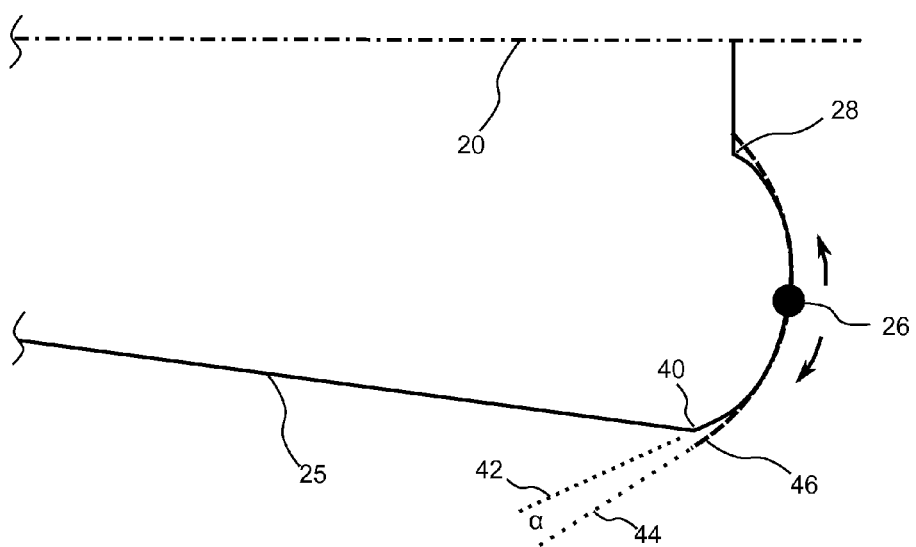
FIG. 4 shows a detail enlargement of a schematic longitudinal section through a roller having an end surface according to a further exemplary embodiment of the present invention.

In a further exemplary embodiment illustrated in FIG. 4, the starting point 26 is disposed between a radially outer end 40 of the abutment surface 24, which outer end 40 is adjacent to the rolling surface 25, and a radially inner end 28 of the abutment surface 24, which inner end is spaced radially inward of the rolling surface 25, wherein the curvature of the abutment surface increases monotonically or strongly monotonically from the starting point 26 towards both ends of the abutment surface 24.

The change of curvature of the abutment surface 24 can be defined for example by determining the angle α between a tangential plane 42 at the end 40 or 28 of the abutment surface 24 and a second tangential plane 44 on a spherical surface 46 that extends from the starting point 26 up to the end of the abutment surface 24, the curvature of which spherical surface 46 corresponds to the curvature at the starting point 26, as illustrated in FIG. 4.

According to some exemplary embodiments, the monotonically or strongly monotonically increasing curvature of the abutment surface 24 makes possible a change of curvature of the abutment surface 24 in an angular range α from greater than 0° up to 30°, preferably in a range 0° 0' 6"≤α≤30°.

Figure 5:
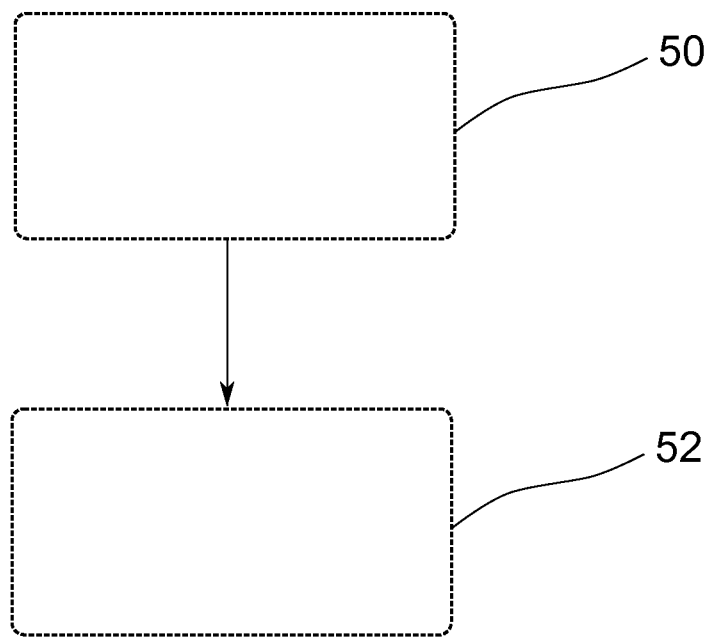
FIG. 5 shows a schematic flow diagram for an exemplary embodiment of a manufacturing process for a roller.

For the sake of completeness, an exemplary embodiment of a manufacturing method for manufacturing a roller for a roller bearing will now be explained with reference to FIG. 5.

In a preparation step 50, a roller for a roller bearing having an end surface terminating a raceway is provided; and In an optimization step 52, an abutment surface 24 for a flange of a bearing ring is produced on the end surface, the curvature of which abutment surface 24 increases monotonically from a starting point 26 on the abutment surface 24 up to an end 28 of the abutment surface 24.

In summary, the proposed rollers are suited to reduce the sensitivity of the roller-flange contact point to alignment errors and skewing of the bearing in use, but nevertheless to be able to ensure a sufficient guiding of the roller on the raceway during operation. Embodiments of the inventive rollers ensure a good roller guiding with low Hertzian pressure, as well as a low risk for edge overlaps and the undesirable edge stresses resulting therefrom.

In other words, embodiments of the inventive roller geometry may have the following advantageous features:

The roller guiding during operation is preserved due to the curved abutment surface, Low Hertzian pressure due to the curved abutment surface, The curvature of the abutment surface increasing to the end reduces the size of the contact ellipse in comparison with purely spherical flanges, whereby an overlapping of the contact ellipse with the flange edges is avoided, Due to the curvature of the abutment surface that increases to the end, there is a lower sensitivity of the location of the contact point between the flange and the abutment surface or roller end side to alignment errors, A defined contact point between the roller end side and the flange is possible.

The proposed roller-flange geometry is designed such that the contact point can lie near the starting point between the roller end side and the flange. If the contact point shifts due to alignment errors towards the ends of the abutment surface, then the sensitivity is greatly reduced, which can prevent a "wandering" of the theoretical contact point out over the flange edge and thus can also prevent high edge pressures.

Although the present invention has been described with reference to an embodiment having tapered rollers and tapered roller bearings, exemplary embodiments are not limited to such designs. In principle, the present invention can also be applied to other rollers and roller bearings, such as e.g. to cylindrical and barrel roller bearings.

REFERENCE NUMBER LIST

10 Roller bearing
11 Bearing inner ring
12 Bearing outer ring
13 Roller
14 Inner roller raceway
15 Outer roller raceway
16 Inner straight line
17 Outer straight line
18 Bearing axis of rotation
19 Center of rotation
20 Roller axis
21 Roller end side
22 Contact point
23 Spherical flange
24 Abutment surface
25 Raceway
26 Starting point
28 Inner end of the abutment surface
30 First gap size
32 Second gap size
34 Further end surface portion
36 First region
38 Second region
40 Inner end of the abutment surface
42 Tangential plane
44 Second tangential plane
46 Spherical surface
50 Preparation step
52 Optimization step

The invention claimed is:

1. A tapered roller for a tapered roller bearing having an end surface that terminates a rolling surface, wherein the tapered rolling element has an abutment surface for contacting a flange of a bearing ring, the curvature of the abutment surface increases monotonically with an increasing of the curvature from a starting point on the abutment surface up to an inner endue of the abutment surface that faces away from the raceway.

2. The tapered roller according to claim 1, wherein the starting point is disposed between an outer end of the abutment surface, which outer end is adjacent to the raceway, and the inner end of the abutment surface, which inner end is facing away from the raceway, wherein the curvature of the abutment surface increases monotonically from the starting point towards both ends of the abutment surface.

3. The tapered roller according to claim 1, wherein the starting point is disposed on the outer end of the abutment surface, which outer end is adjacent to the raceway.

4. The tapered roller according to claim 1, wherein a first region of the abutment surface, which first region comprises the starting point, has a constant first curvature which is smaller than a second curvature of the abutment surface in a second region adjacent to the first region.

5. The tapered roller according to claim 1, wherein the curvature increases strongly monotonically from the starting point up to the respective end of the abutment surface.

6. The tapered roller according to claim 1, wherein an angle between a tangential plane at the end of the abutment surface and a second tangential plane on a spherical surface corresponding to the curvature at the starting point, which spherical surface extends from the starting point up to the end of the abutment surface, falls in a range from greater than 0° to 30°.

7. A roller bearing having at least one tapered roller according to claim 1.

8. A roller bearing according to claim 7, wherein a flange extending away from a raceway of a bearing ring has a surface region facing towards the abutment surface of the tapered roller, which surface region has a curved surface of constant curvature.

9. A method for manufacturing a tapered roller for a roller bearing, comprising:
   providing a tapered roller for a roller bearing having an end surface that terminates a rolling surface; and
   producing an abutment surface for a flange of a bearing ring on the tapered roller, the curvature of the abutment surface increases monotonically with an increasing of the curvature from a starting point on the abutment surface up to an inner end of the abutment surface that faces away from the raceway.

10. The tapered roller according to claim 1, wherein the starting point is disposed between a radially outer end of the abutment surface, which radially outer end is adjacent to the raceway, and a radially inner end of the abutment surface, which radially inner end is spaced radially inward from the raceway, wherein the curvature of the abutment surface increases monotonically from the starting point towards both the radially outer end and toward the radially inner end of the abutment surface and wherein an angle between a tangential plane at the radially outer end and a second tangential plane on a spherical surface corresponding to a curvature at the starting point, the spherical surface extending from the starting point up to the radial outer end of the abutment surface, falls in a range from greater than 0° to 30°.

11. The tapered roller according to claim 1, wherein the starting point is disposed on a radially outer end of the abutment surface adjacent to the raceway and wherein an angle between a tangential plane at the radially outer end of the abutment surface and a second tangential plane on a spherical surface corresponding to a curvature at the starting point, the spherical surface extending from the starting point up to the radially outer end of the abutment surface, falls in a range from greater than 0° to 30°.

12. A tapered roller for a tapered roller bearing, the tapered roller bearing having a raceway and a flange, the tapered roller having a rolling surface configured to roll on the raceway and an end surface at the end of the rolling surface configured to face the flange, the end surface including an abutment surface having a curvature and a radially outer end and a radially inner end, the abutment surface being configured to contact the flange, wherein the curvature increases monotonically from a starting point on the abutment surface to the radially inner end of the abutment surface.

13. The tapered roller according to claim 12, wherein the starting point is located at the radially outer end of the abutment surface.

14. The tapered roller according to claim 12, wherein the starting point is located between the radially outer end and the radially inner end.

15. The tapered roller according to claim 14, wherein the curvature increases monotonically from the starting point to the radially inner end and from the starting point to the radially outer end.

16. The tapered roller according to claim 12, wherein the curvature increases strongly monotonically.

17. The tapered roller according to claim 13, wherein an angle between a tangential plane at the radially outer end of the abutment surface and a second tangential plane on a spherical surface corresponding to a curvature at the starting point and extending from the starting point to the radially outer end of the abutment surface falls in a range from greater than 0° to 30°.

* * * * *